Feb. 17, 1959 J. A. GITHENS 2,874,313

DATA PROCESSING APPARATUS

Filed Aug. 7, 1956 6 Sheets-Sheet 1

INVENTOR
J. A. GITHENS
BY Alan C. Rose
ATTORNEY

INVENTOR
J. A. GITHENS
BY Alan C. Rose
ATTORNEY

Feb. 17, 1959 J. A. GITHENS 2,874,313

DATA PROCESSING APPARATUS

Filed Aug. 7, 1956 6 Sheets-Sheet 3

INVENTOR
J. A. GITHENS
BY Alan C. Rose
ATTORNEY

Feb. 17, 1959 J. A. GITHENS 2,874,313

DATA PROCESSING APPARATUS

Filed Aug. 7, 1956 6 Sheets-Sheet 4

INVENTOR
J. A. GITHENS
BY Alan C. Rose
ATTORNEY

Feb. 17, 1959 J. A. GITHENS 2,874,313

DATA PROCESSING APPARATUS

Filed Aug. 7, 1956 6 Sheets-Sheet 5

INVENTOR
J. A. GITHENS
BY
Alan C. Rose
ATTORNEY

INVENTOR
J. A. GITHENS
BY Alan C. Rose
ATTORNEY

United States Patent Office 2,874,313
Patented Feb. 17, 1959

2,874,313

DATA PROCESSING APPARATUS

John A. Githens, Morristown, N. J., assignor to Bell Telephone Laboratories, Incorporated, New York, N. Y., a corporation of New York Application August 7, 1956, Serial No. 602,599

1 Claim. (Cl. 307—88.5)

The present invention relates to digital computer or data processing apparatus, and more particularly to structural arrangements of electrical components and interconnections to form basic computer type circuits.

In the binary computer field, a technology has been developed in which only transistors and resistors need be employed. This technology is termed "Direct Coupled Transistor Logic" circuitry, and is often abbreviated to the initials "D. C. T. L." The transistors in such circuits characteristically are arranged in circuit configurations with all or most of the emitters connected to a common point such as ground, and each transistor normally has its base connected to the collector of the preceding transistor. The characteristics of the transistors employed in D. C. T. L. circuits are such that they are de-energized when the input circuit to the base is grounded (in addition to the grounded emitter), or even when the base is brought close to ground potential. In addition, when the transistors are energized, the collector-to-emitter impedance is so low that the voltage at the collector is reduced almost to the ground potential of the emitter. Therefore, when one transistor is energized, the transistor or transistors coupled to it are de-energized. Similarly, when a transistor is de-energized, the transistors coupled to it are energized. Other details relating to the fundamental D. C. T. L. circuits are disclosed in an article by R. H. Beter et al. which appeared at pages 139 through 145 of Part 4 of the 1955 Institute of Radio Engineers Convention Record.

In the construction of computers, it is very convenient to use packaged circuits of general utility which may be incorporated into the desired complete circuit. This technique is flexible and permits prompt physical realization of proposed computer circuitry. In the past, it has been customary to assemble individual functionally distinct logic circuits (such as And units, Or units, and multivibrators) in individual packages. It has been determined, however, that computer circuits made up of separately packaged logic circuits tend to be unnecessarily bulky.

Accordingly, the principal object of the present invention is the simplification and the reduction in physical size of binary data processing apparatus.

In accordance with one aspect of the present invention, it has been discovered that all of the basic D. C. T. L. circuits can be instrumented by the use of resistors having a single value of resistance. This factor, in combination with the similarity in the pattern of connections for the basic logic circuits, means that it is practical to form large packages of transistors with the transistors and resistors rigidly mounted in place. In addition, many of the electrical connections which are identical in all or in most of the basic logic circuits are completed in advance. The resistors, transistors, and the connections mentioned above are advantageously encapsulated in a suitable insulating material. Specific data processing systems are formed at a later date by interconnecting the transistor and resistor terminals which are left exposed.

Turning to another aspect of the invention, a severe problem which is presented in D. C. T. L. circuitry is that of crosstalk. One factor which contributes to this difficulty is the very low signal levels which are employed; with germanium transistors the output voltages in the energized and de-energized states are about 75 millivolts and 270 millivolts, respectively. Another contributing factor is that base-to-emitter circuits of transistors in the "non-conducting" state have as much as 75 millivolts of forward bias. Under these conditions, any extraneous signals appearing on the emitters are readily coupled to the collector and appear as noise in the system. The extraneous signals appearing on the emitters may be developed by switching currents flowing in the unavoidable inductance of the common emitter connection, that is, in the ground system.

Therefore, the reduction of crosstalk is another object of the invention.

This object is realized by mounting the grounded emitter transistors close together and close to a conducting ground plate, and by connecting the emitter electrodes of the transistors to the plate by short leads. This construction reduces the impedance and the physical extent of the ground system, and thus greatly reduces crosstalk. In one embodiment of the invention, this effect is enhanced by mounting the transistors on both sides of the ground plate.

In addition, a book-like construction may be employed, using one central two-sided assembly and two hinged assemblies having transistors on but one side. Such an arrangement maintains the necessary structural compactness while permitting full accessibility to computer terminals.

Other objects and various advantages and features of the invention may be readily apprehended by reference to the following description taken in connection with the appended claims and the accompanying drawings.

Figure 1:
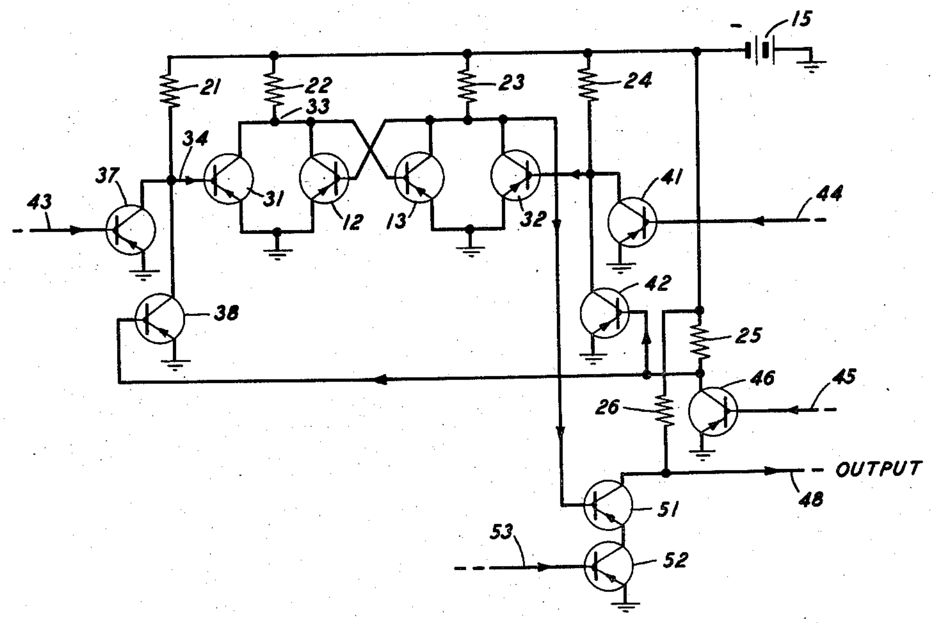
Fig. 1 is a circuit diagram of an illustrative direct coupled transistor logic circuit.

With reference to the drawings, Fig. 1 is a circuit diagram of a multivibrator and its associated input and output circuits. The circuits of Fig. 1 are direct coupled transistor logic circuits. As indicated by the direction of the arrowhead designating the emitter lead of each transistor, PNP transistors are employed in the illustrative circuit of Fig. 1. The arrowheads which are not within the circles representing transistors indicate the flow of signal information, and do not represent current flow.

In Fig. 1, the multivibrator per se is made up of the transistors 12 and 13. The emitters of both of transistors 12 and 13 are grounded in the usual manner for most of the transistors in direct coupled transistor logic circuits. In addition, the collectors and bases of the two transistors are cross-connected. Thus, when either transistor is energized the base of the other transistor is brought nearly to ground potential, and the other transistor is therefore de-energized.

Potential is supplied to the collectors and bases of transistors 12 and 13 and the other transistors in the circuit of Fig. 1 from the voltage source 15. The load resistors 21 through 26 are connected between the transistors and the voltage source 16. In accordance with the invention, the load resistors may all be of the same value of resistance. The value of resistance which is employed depends on the magnitude of the voltage source and the type of transistors which are employed. Representative values will be given in a later paragraph.

The collector-to-emitter circuits of the control transistors 31 and 32 are connected in parallel with those of the transistors 12 and 13, respectively. Assuming that the transistor 13 is energized and thus is in the low resistance state, the other transistor 12 of the multivibrator is de-energized. It is also assumed that the transistor 31 is de-energized at this moment. The current flowing through resistor 22 is now applied to the base-to-emitter circuit of the transistor 13. When the base 34 of the transistor 31 becomes substantially negative, however, transistor 31 will be energized. This reduces the potential across transistor 31 and the point 33 changes nearly to ground potential. The change in voltage at point 33 reduces the biasing current applied to the base of transistor 13 so that it is de-energized. Current is now supplied to the base of transistor 12 from resistor 23. The state of the multivibrator 12, 13 has now been reversed.

With the multivibrator in its new state in which transistor 12 is conducting and transistor 13 is de-energized, transistor 31 loses control of the multivibrator. That is, the multivibrator will remain in the same state even though transistor 31 is turned on and off a number of times. The control of the multivibrator including transistors 12 and 13 has passed to the transistor 32; and the energization of this transistor causes the multivibrator to resume its previous state with transistor 13 conducting.

The state of transistor 31 is controlled by transistors 37 and 38. Transistors 37 and 38 have their collector-to-emitter circuits connected in parallel between the base lead 34 of transistor 31 and ground. When both transistors are de-energized, lead 34 becomes negative, and transistor 31 is operative to change the state of the multivibrator 12, 13. When only one of the transistors 37 or 38 is de-energized, the base 34 of transistor 31 remains close to ground potential, and the transistor 31 remains de-energized. The two transistors 37 and 38, therefore, may be considered to be an And circuit, having the property that when both transistor 37 and transistor 38 are de-energized, the transistor 31 is energized. On the other hand, transistors 37 and 38 may be considered to be an Or circuit, on the basis that if either transistor 37 or transistor 38 is energized, the base lead 34 is maintained at ground potential, and the transistor 31 is de-energized. However, in view of the phase reversal which takes place in each stage of direct coupled transistor logic circuits, it is generally preferable to avoid the use of the designations "And circuit" or "Or circuit." Instead, the circuits are more aptly described as "series" or "parallel" circuits, depending on whether the two transistors have their collector-to-emitter circuits connected in series or in parallel.

The two transistors 41 and 42 form a parallel circuit at the input to the control transistor 32. The operation of the transistors 41 and 42 in controlling the energization of the transistor 32 is identical to that described above in connection with the operation of transistors 37 and 38 in controlling transistor 31.

The circuit of Fig. 1 is actually a portion of a shift register in which the state of another multivibrator is transferred to the multivibrator 12, 13 shown in Fig. 1. The output leads from another multivibrator are therefore connected to input leads 43 and 44 to the transistors 37 and 41, respectively. At the instant when it is desired to shift the information from the other multivibrator to the multivibrator 12, 13, a signal is applied to the lead 45 connected to the base of transistor 46. The transistor 46 is a simple inversion stage which applies ground potential to the bases of transistors 38 and 42 to turn them off when it is energized. Thus, the energization of input lead 45 by a negative pulse permits the application of a substantial negative voltage to the base of either control transistor 31 or transistor 32, depending on the state of the other multivibrator. This insures the coincidence of the state of the multivibrator 12, 13 with that of the multivibrator connected to input leads 43 and 44.

Output signals from the multivibrator 12, 13 appear on lead 48. The two transistors 51 and 52 are in a series D. C. T. L. circuit configuration, and signals are applied to transistor 52 on lead 53. Both transistors 51 and 52 must be energized in order for the output lead 48 to drop to ground potential. If either transistors 51 or 52 are de-energized, the output lead 48 will remain at a substantial negative voltage.

Concerning the parameters of the circuits of Fig. 1, the transistors may be either junction type (PNP or NPN as required), or surface barrier transistors. Suitable transistors are Western Electric type GA 52609 (an NPN alloy junction transistor), the Raytheon CK 761 (a PNP alloy junction transistor), or General Electric 4JD 1A–20 (a PNP alloy junction transistor). Each of the circuits is operative over a wide range of supply voltages; for example, voltages from one-half volt to twelve volts have been employed. This wide variation is possible because the critical ratio of base-to-collector current remains substantially the same with variations of supply voltage. In general, it is desirable to supply the transistors with about four milliamperes of collector current. When a two volt supply is employed, collector resistors of 510 ohms may be employed. The foregoing specific transistor types and the values of resistance and voltage are not critical and are given merely to illustrate one workable set of components which may be employed.

Figure 2:
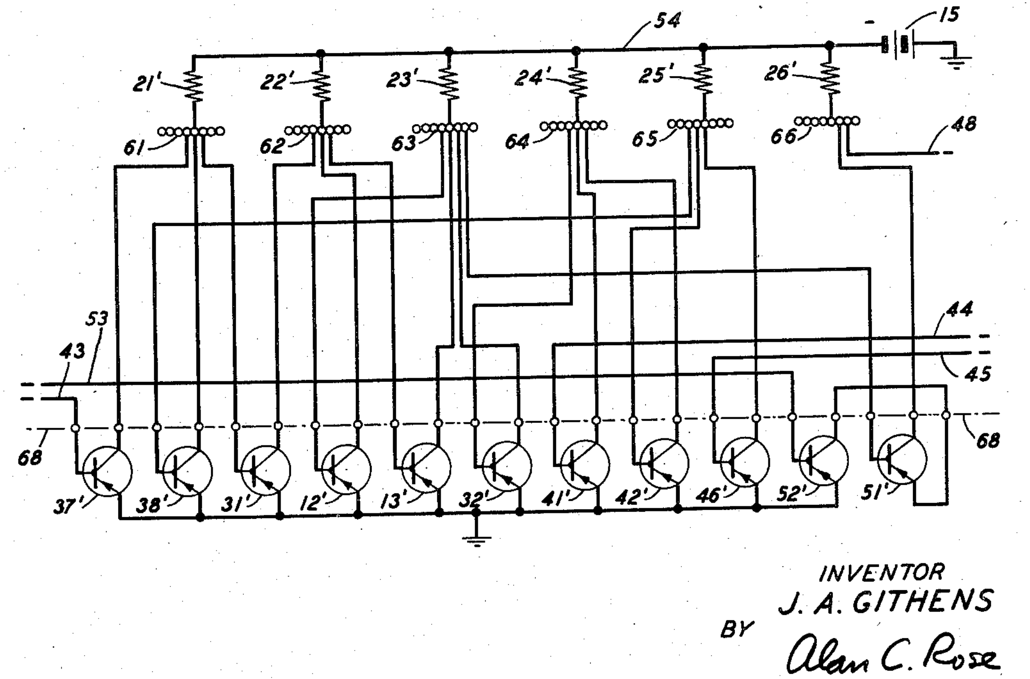
Fig. 2 is the identical circuit shown in Fig. 1 redrawn to indicate its applicability to packaged circuit techniques.

The circuit of Fig. 2 has the same connections as the circuit of Fig. 1, but has been redrawn to indicate the similarity between the various functionally distinct circuits of Fig. 1. For convenience in comparing Figs. 1 and 2, the electrical components in Fig. 2 are identified with primed reference numerals corresponding to the unprimed reference numerals of Fig. 1. Thus, the multivibrator circuit, the series transistor circuit, and the parallel transistor circuits, as well as the simple inversion stage, all take very nearly the same form as redrawn in Fig. 2.

In Fig. 2, each of the resistors 21' through 26' has one lead connected to the voltage supply conductor 15 and the other lead connected to a terminal assembly designed to receive several leads. The terminal assemblies 61 through 66 are associated with the resistors 21' through 26', respectively. As clearly shown in Fig. 2, the emitters of transistors 12', 13', 31', 32', 37', 38', 41', 42', 46', and 52' are all connected to ground. The bases and collectors of each of these transistors appear at terminals along the dash-dot line 68 in Fig. 2. The transistor 51' has all three of its terminals available. In comparing Fig. 2 with Fig. 1, it may be noted that the entire circuit of Fig. 1 may be developed merely by jumper connections between the available terminals 61 through 66 of the resistors and the terminals of the transistors which appear along line 68.

Figure 3:
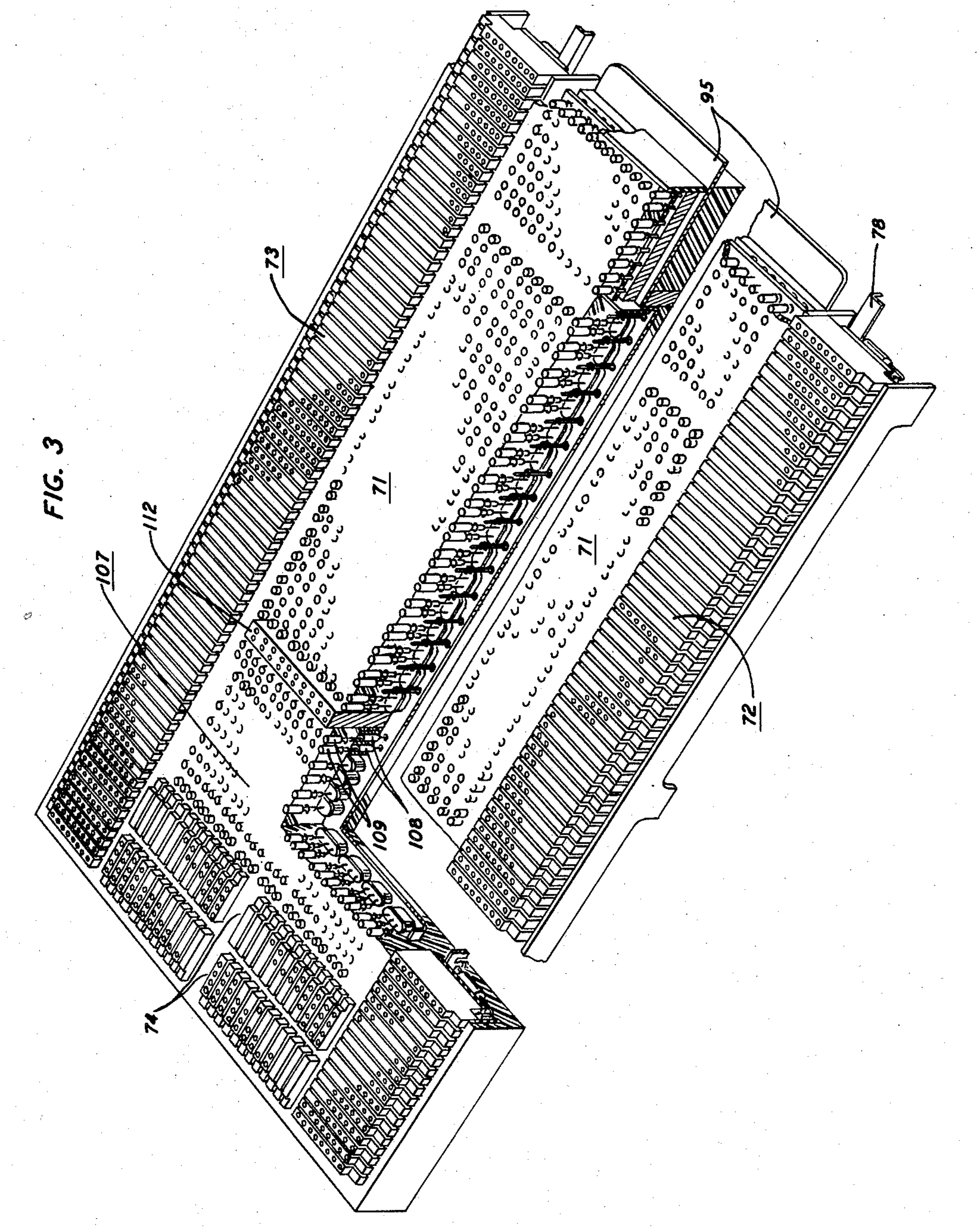
Fig. 3 is a perspective view of a data processing package including rows of transistors and resistors of a single value, in accordance with the invention.
Figure 4:
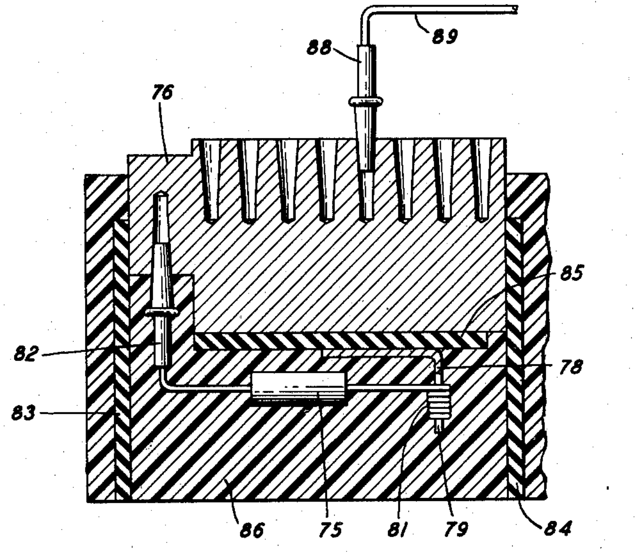
Fig. 4 is a cross-sectional view of a part of the assembly of Fig. 3 showing a resistor rigidly mounted in place.
Figure 5:
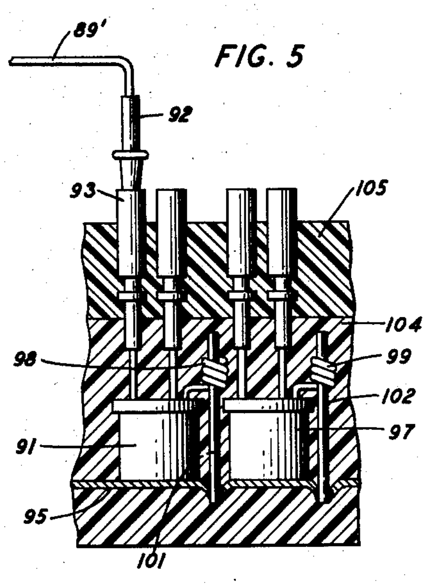
Fig. 5 is another cross-sectional view of the assembly of Fig. 3 showing two transistors.

Figs. 3, 4, and 5 are several views of a computer package embodying the principles of the invention. It includes transistors and resistors and their connections which are the same for the many functionally distinct logic circuits. Thus, for example, the package of Fig. 3 includes the circuitry of Fig. 2 below the dashed line 68 and above and including terminals 61 through 66.

The terminals which appear at the surface of the package of Fig. 3 correspond to the terminals 61 through 66 and the terminals along the line 68 in Fig. 2. The transistors in the common emitter circuit configurations are located in the areas designated 71 in the plate of Fig. 3. The resistors are located along the two edges of the package at 72 and 73, and in two rows 74 at one end of the package.

Fig. 4 is a cross-sectional view showing one resistor 75 and its associated terminal block 76. In Fig. 3, the voltage supply conductor 78 may be observed extending from one end of the computer package. As seen in Fig. 4, the voltage supply conductor 78 is notched to provide a terminal post 79 underlying each terminal block. One lead from the resistor 75 is secured to the terminal post 79 by the wrapped wire connection 81. The other lead of the resistor 75 is secured to the terminal block 76 by the plug connector 82. The insulating strips 83, 84, and 85, which may be of phenolic material, provide structural rigidity to the assembly prior to encapsulation by the plastic medium 86. The insulating phenolic strip 85 also spaces the voltage supply conductor 78 from the terminal block 76.

The upper surface of the terminal block 76 is provided with a plurality of recesses for receiving plugs which will be employed to interconnect resistors and transistors. One such plug is shown at 88 in Fig. 4. The lead 89, which is connected to the plug 88, is designed to make connection from the resistor 75 to one transistor with which the resistor is associated.

Fig. 5 is another cross-sectional view of the package of Fig. 3 showing two grounded emitter transistors in the region 71. In Fig. 5, the lead 89' is connected to the collector of the transistor 91. This connection is made through the plug 92 and the associated jack 93, which is in turn connected to the collector lead of the transistor 91.

The ground plate 95 of the transistor package may be seen both in Fig. 3 and in the cross-sectional view of Fig. 5. The grounded emitter transistors such as transistors 91 and 97 have their emitters connected to the conducting ground plate 95 by wrapped wire connections 98 and 99. The wrapped wire connections are made to the conducting posts 101 and 102 which extend through perforations in the ground plate. This mode of construction insures good physical and electrical contact between the ground plate 95 and the posts 101 and 102.

In the plastic encapsulation process, the transistors are first secured in place by the emitter-to-ground connections. The transistors are then covered with a layer 104 of resilient insulating material such as silicone rubber. Thereafter, an additional layer 105 of an epoxy resin is added to cover the silicone rubber and provide a rigid supporting structure for the jacks to which the collector and base electrodes of the transistors are connected.

Referring again to the structure of the computer package of Fig. 3, it has been noted that the area 71 includes an array of transistors having their emitters grounded. In addition, the location of the resistors and their associated terminal blocks on two sides and one end of the plate has been discussed. The computer package of Fig. 3 also includes a small group 107 of transistors having all three electrodes available. A few transistors having their emitter connections available are required for series circuit arrangements. For example, in instrumenting the circuit of Fig. 1, the transistor 51 would be one of the three terminal transistors in area 107 of Fig. 3. In addition, the transistor plate of Fig. 3 includes a few resistors 108, each of which has one terminal grounded and the other terminal connected to one of the jacks 109. These are "bleeder" resistors which are occasionally employed when current from one of the standard resistors is supplied only to the collector of one transistor and the base of the next transistor. When it is desired to speed up de-energization of the driven transistor, a bleeder resistor may be connected to ground in shunt with the two transistors. A number of grounded jacks are also made available through the provision of the brass block 112, which is directly connected to the conducting ground plate 95. The brass block 112 also serves to separate the group of transistors 71 having their emitters grounded from the bleeder resistors and the transistors 107 which have all three terminals available.

Figure 6:
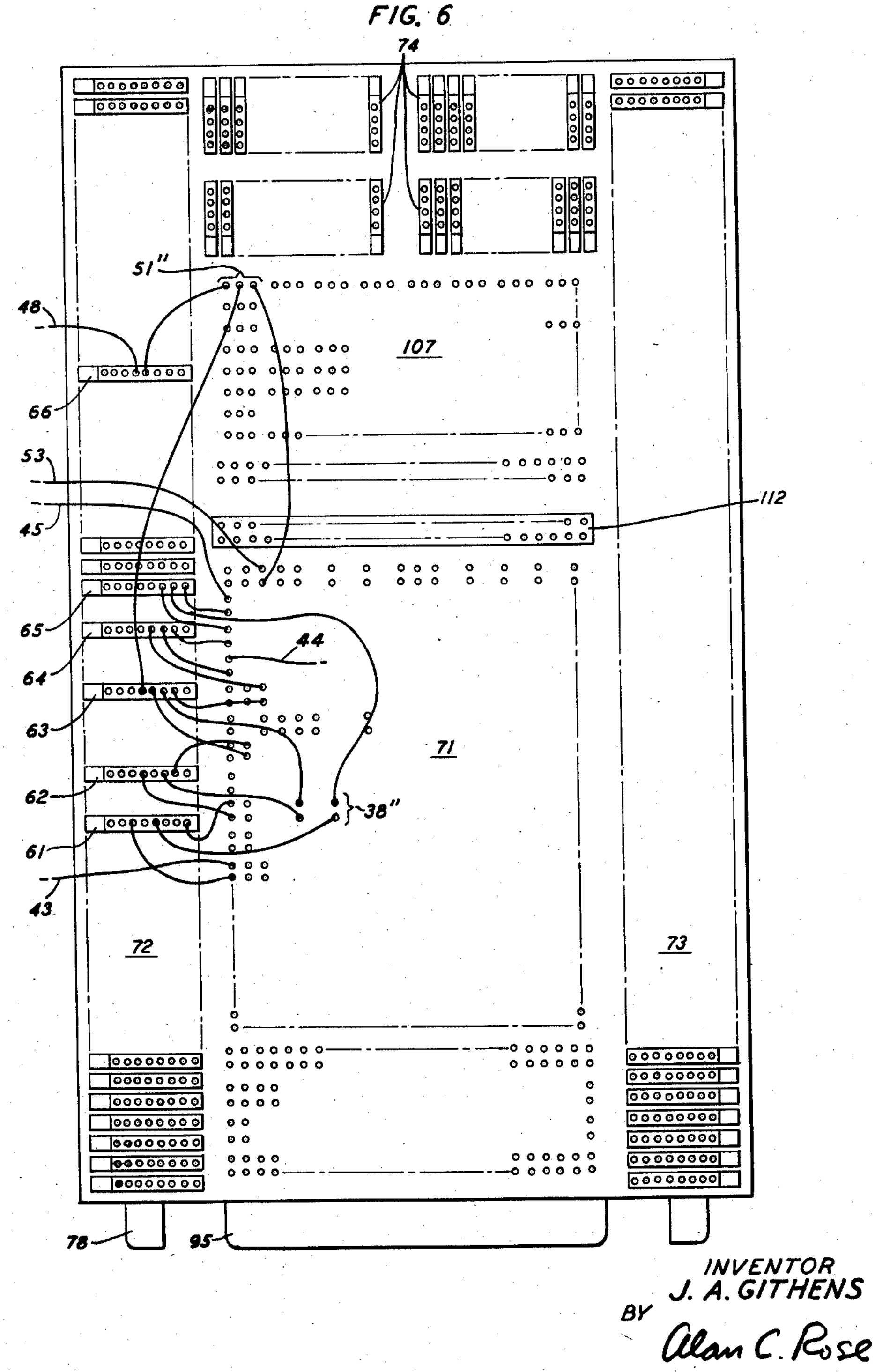
Fig. 6 is a plan view of the assembly of Fig. 3 showing the jumper connections required to implement the circuit of Figs. 1 and 2.

Fig. 6 is a plan view of the computer package of Fig. 3, showing the connections required to implement the circuit of Figs. 1 and 2. The interconnections may be made by plug and jack connections of the type indicated at 88, 89, 89', and 92 in Figs. 4 and 5. In comparing Figs. 2 and 6, it may be noted that the terminal blocks 61 through 66 and the input and output leads bear identical numbers in the two figures. In addition, the three exposed terminals of transistor 51' of Fig. 2 are shown at 51'' in the area 107 of the computer package in Fig. 6. The two terminals 38'' associated with the grounded-emitter transistor 38' are also shown in Fig. 6 in the array of transistors designated 71.

Other arrangements for interconnecting the exposed terminals of the transistors and resistors may also be employed. For example, each terminal shown in Figs. 3 through 6 as a jack could be brought out as an exposed pin. The appropriate interconnections would then be made by automatic mechanical wiring machines as taught in R. F. Mallina, application Serial No. 370,147, filed July 24, 1953, and R. F. Mallina, application Serial No. 401,505, filed December 31, 1953.

Figure 7:
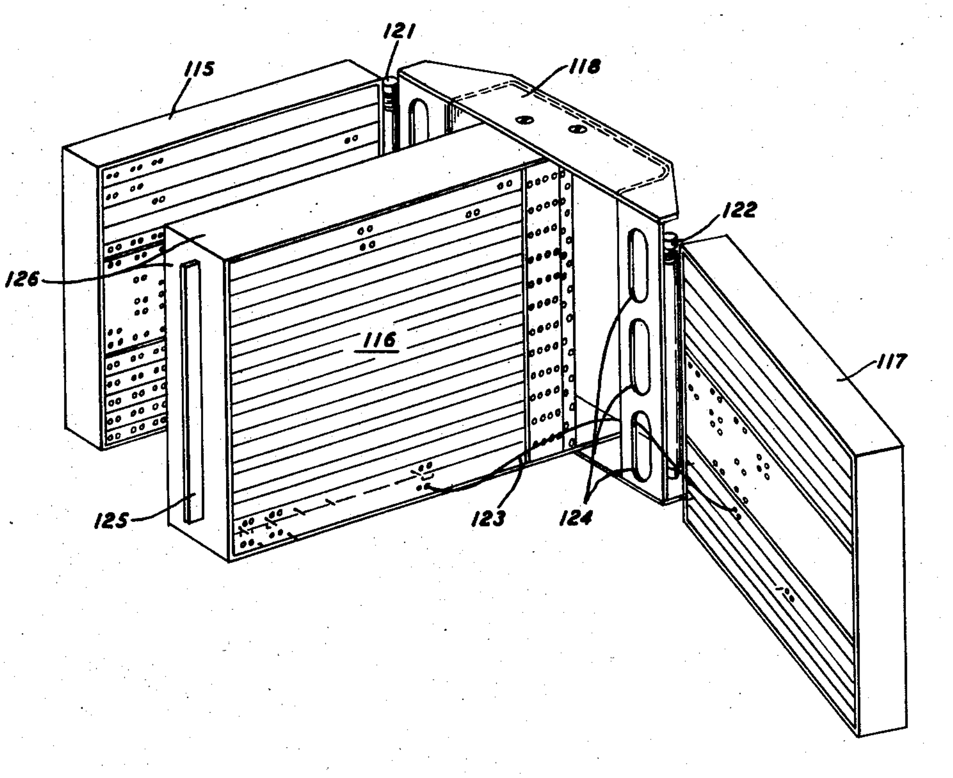
Fig. 7 shows a computer apparatus in which several plates which are similar to the assembly of Fig. 3 are mounted in a compact book-like arrangement.

Fig. 7 illustrates a computer apparatus in which three transistor plates are employed. In Fig. 7, the central transistor plate 116 is rigidly secured to the mounting frame 118. The two outer plates 115 and 117, however, are connected to the mounting bracket 118 by the hinges 121 and 122, respectively. The apertures 123 in the frame member 118 are provided to facilitate the interconnection of components on plates 116 and 117. By looping jumper connections, such as the lead 123, through the openings 124, the wiring assumes an orderly arrangement, and the plates 115 and 117 may be readily opened and closed even after the completion of wiring.

The assembly of Fig. 7 could be made up of four computer packages such as that shown in Fig. 3. In this event, two of the packages would be rigidly mounted back to back in place of the central plate 116 of Fig. 7, and the two additional plates would be mounted at 115 and 117.

In Fig. 7, the structural arrangement of components and the location of terminals for their interconnection are somewhat different than in the package of Fig. 3. These differences will be discussed in some detail in connection with Figs. 8 and 9. The principal differences are the location of transistors having grounded emitters on both sides of the central fixed computer assembly 116, and the location of the resistors and the transistors having three terminals available, in the outer plates 115 and 117. As a result of this different structural arrangement of components, a more flexible system of terminals was developed in which each transistor electrode has at least two external terminals. This permits the direct interconnection of transistor electrodes on the surfaces of the assembly 116, for example.

Figure 8:
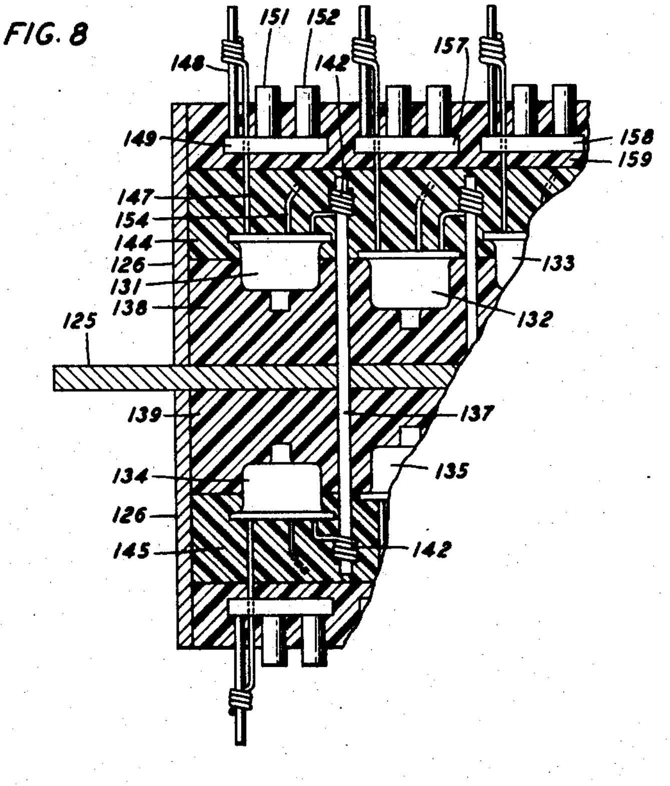
Fig. 8 is a partial cross-sectional view of the central plate in the assembly of Fig. 6.

Instead of making the central rigid package 116 from two "one-sided" packages such as the package shown in Fig. 3, a single ground plate 125 is employed with transistors mounted on both sides. The sheet metal supporting strip 126 extends around the edges of the package 116, and also forms part of the ground structure of the computer assembly. The ground plate 125 is shown in Fig. 6 extending through the sheet metal strip 126, but the internal construction of the assembly 116 is more clearly shown in the cross-sectional view of Fig. 8. In Fig. 8, three ground-emitter transistors 131, 132, and 133 are shown mounted on one side of the ground plate 125, and two grounded-emitter transistors 134 and 135 are shown mounted on its other side. A conducting post 137 extends through the ground plate 125 and makes physical and electrical contact with it. Following the securing of posts such as 137 in position in the ground plate 125, preliminary layers 138 and 139 of a resilient material such as silicone rubber are poured and solidified on both sides of the plate 125. The transistors such as 131 through 135 on both sides of the ground plate 125 are then mounted in place, and their emitter leads are securely wrapped to the posts which extend through the ground plate. Two such connections are shown at 141 and 142. Additional layers 144 and 145 of resilient material are then poured over the rows of transistors. The layers of silicone rubber or other elastic material provide a resilient protective mounting arrangement for the rows of transistors.

Each base and collector electrode of the transistors such as 131 through 135 is provided with two external terminals. For example, the collector lead 147 of the transistor 131 is brought out and secured to the post 148, which is part of a terminal assembly block 149. The terminal assembly block is provided with two jackets 151 and 152 for receiving plugs of the type shown at 92 in Fig. 5. The base lead 154 of the transistor 131 is connected to a terminal block (not shown) which is similar to the terminal block 149. The collector and base electrodes of the other transistors mounted on both sides of the ground plate 125 are also connected to terminal blocks each of which provides two plugs for connection with other electrical components. Two other terminal blocks are shown at 157 and 158 in Fig. 8. The terminal blocks 149, 157, and 158 are all mounted in a rigid strip of insulating material 159 which may, for example, be an epoxy resin. These terminal strips are precast and assembled after the pouring of the second layers 144, 145 of resilient material. The terminal strips interlock with each other, and are secured in place by structural posts (not shown) which extend through the ground plate 125 in both directions in a manner similar to the post 137 and then pass through holes in the plastic terminal strips such as 159. The ends of the structural posts are then enlarged so that the posts form elongated rivets which pass through the entire computer assembly 116.

In Fig. 7, the central package 116 is made up principally of transistors having their emitter electrodes grounded. The outer assemblies 115 and 117 include transistors having all three terminals available, and also include the standard resistors. Connections between two grounded emitter transistors may be made by short leads directly on the surfaces of package 116. Interconnections between transistors having grounded emitters and the elements located in the outer plates 115 and 117, however, are threaded through the openings 124 in the manner shown in Fig. 7 by the lead 123.

Figure 9:
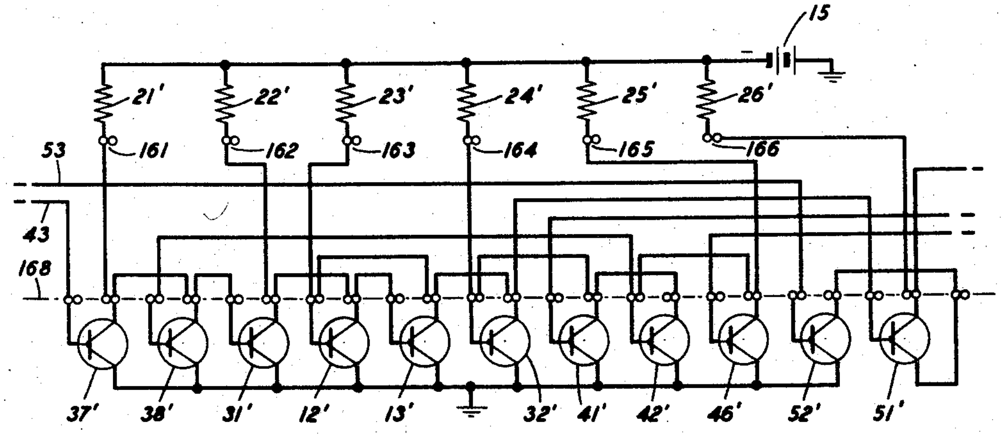
Fig. 9 is another version of the circuit of Fig. 1 in which the exposed terminals are grouped in pairs.

Fig. 9 is a circuit diagram showing the circuit of Figs. 1 and 2 in terms of the two-terminal circuit pattern established by the structure of Figs. 7 and 8. In Fig. 9, the electrical components and the input and output leads bear the same reference numbers as the comparable elements in Fig. 2. Instead of the eight-terminal blocks associated with each resistor, however, the circuit of Fig. 9 shows only two terminals associated with the exposed lead of each resistor. The terminal pairs 161 through 166 are associated with the resistors 21′ through 26′ in Fig. 9. Similarly, in Fig. 9 each of the ungrounded electrodes of the transistors is connected to two exposed terminals along the dash-dot line 168. In view of the fact that the circuit of Fig. 9 is identical in its mode of operation with the circuits of Figs. 1 and 2 which have been discussed above, no further discussion of Fig. 9 is required.

In closing, some important features of the present data processing packages will be emphasized. These features include compactness, ruggedness, adaptability, accessibility of terminals for testing, and high reliability. The compactness and ruggedness of the apparatus is achieved by the plastic encapsulation of large numbers of resistors and transistors in relatively large packages. The adaptability is obtained by the extension of appropriate terminals of the transistors and resistors out of the package unit. The same terminals which are required for adapting the computer package to different circuital configurations are also required for test and trouble shooting purposes. Thus, the availability of the critical terminals serves two important functions.

The high reliability is obtained by reducing crosstalk through the use of ground plates on which the rows of closely spaced transistors are mounted and to which their emitters are connected. By using the ground plate as the basic element in each data processing package, an integral assembly is produced having all of the advantages enumerated above.

It is to be understood that the above-described arrangements are illustrative of the application of the principles of the invention. Numerous other arrangements may be devised by those skilled in the art without departing from the spirit and scope of the invention.

What is claimed is:

In a binary data processing apparatus, a conductive plate, a plurality of transistors having their emitters connected to said plate, a plurality of resistors of a single value, a conductor for supplying voltage to said apparatus, one terminal of each of said resistors being connected to said conductor, insulating material secured to said plate and surrounding said transistors and the connections between said emitters and said plate, while leaving the other terminals of said transistors exposed, additional insulating material surrounding said resistors and the connections between said resistors and said voltage supply conductor while leaving the other terminal of said resistor exposed, and conducting means external to said insulating material for interconnecting the bases and collectors of said transistors and the other terminals of said resistors to form a plurality of functionally distinct logic circuits, said data processing apparatus further comprising a central fixed assembly including a conducting ground plate and transistors located on both sides of said plate and having exposed terminals extending outwardly in both directions from said plate, and two flat hinged assemblies each including a conductive plate and associated components arranged as defined above, said hinged assemblies being substantially coextensive with said fixed assembly and having exposed terminals facing said fixed assembly.

References Cited in the file of this patent

FOREIGN PATENTS 440,269 Great Britain ------------ Dec. 24, 1935

OTHER REFERENCES

Scientific American, pp. 258, 259 and 60, December 1947.

Electronics for June 1955, pp. 132–136.